Figure 1:
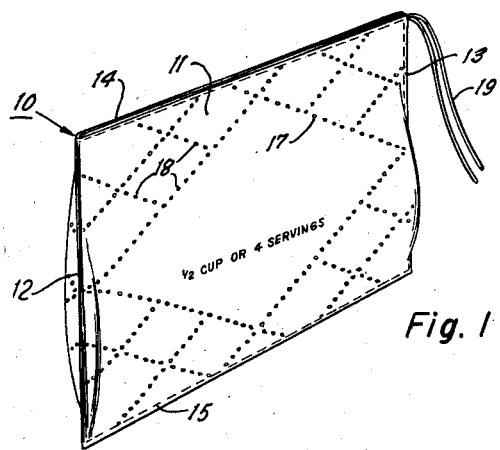

March 12, 1963 N. W. GAY 3,081,174
RICE COOKING PACKAGE
Filed Nov. 15, 1954

INVENTOR
Newsome W. Gay

BY *Ahley & Ahley*

ATTORNEYS

United States Patent Office 3,081,174
Patented Mar. 12, 1963

3,081,174
RICE COOKING PACKAGE
Newsome W. Gay, Dallas, Tex., assignor to Min-O-Matic, Inc., Dallas, Tex., a corporation of Texas
Filed Nov. 15, 1954, Ser. No. 468,753
2 Claims. (Cl. 99—171)

This invention relates to new and useful improvements in rice cooking containers and processes.

One object of the invention is to provide an improved container for cooking rice in predetermined quantities and having an enclosure of disposable material resistant to heat and water for confining the rice whereby the rice may be cooked without handling and with minimum effort and utensils.

An important object of the invention is to provide an improved container to perfect the cooking of rice which includes an enclosure formed of thin, flexible material having minute openings through which the water soluble starches of the rice are adapted to be emitted by the pressure created within the enclosure during cooking whereby the cooked rice is fluffy, non-sticky and relatively free from water soluble starches.

A particular object of the invention is to provide an improved disposable container, of the character described, for packaging and cooking rice wherein the minute perforations which permit the escape of water soluble starches while confining the rice are arranged and spaced in such manner as to prevent undue weakening and accidental tearing of the enclosure, the material of said enclosure being frangible to permit opening of said enclosure and removal of the cooked rice.

Another object of the invention is to provide an improved rice container, of the character described, which prevents undue agitation by stirring during cooking of the rice so as to reduce breaking of the rice grains and which reduces the release of starches irrespective of the broken grain content of the rice.

An object of the invention is to provide an improved disposable rice container, of the character described, for enclosing a measured quantity of rice for cooking thereof and being closed for the packaging the rice or openable for insertion of a measured quantity of rice by the user.

An object of the invention is to provide an improved process of cooking rice wherein a measured quantity of rice is inserted in a disposable enclosure of pliable material having minute openings whereby the water soluble starches evolved from the rice during cooking are emitted through the openings so as to be separated from the rice, the enclosure being torn to permit removal of the cooked rice.

A further object of the invention is to provide an improved rice cooking process, of the character described, wherein the enclosure is placed in cooking relation to a body of heated water for boiling or steaming the rice and the cooked rice is fluffy, non-sticky and substantially free from water soluble starches.

A construction designed to carry out the invention will be hereinafter described together with other features of the invention.

Figure 2:
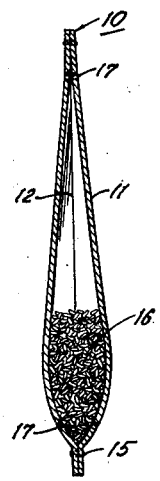
Figure 3:
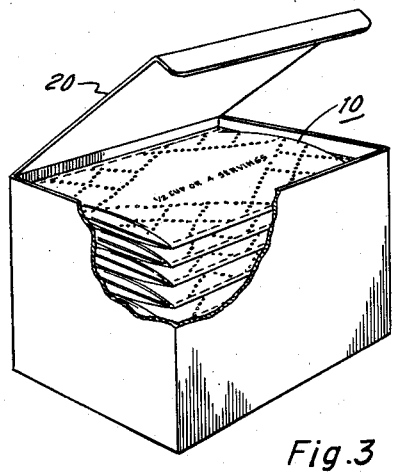
Figure 4:
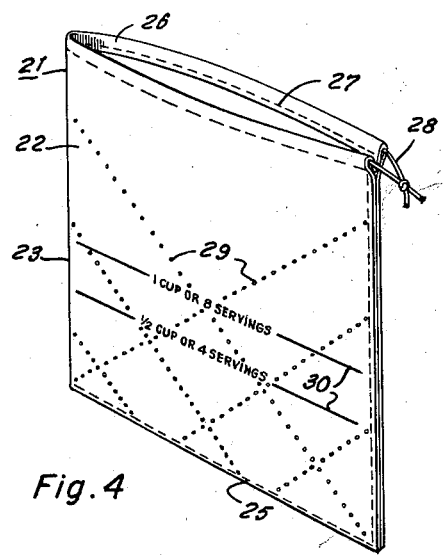
Figure 5:
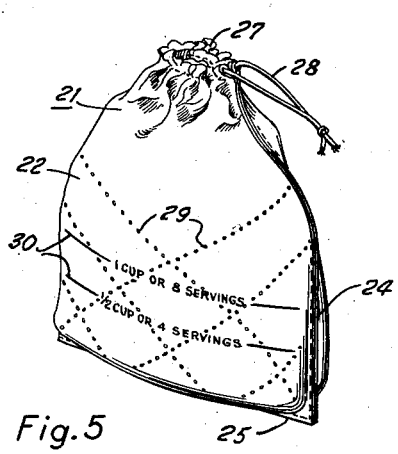

The invention will be more readily understood from a reading of the following specification and by reference to the accompanying drawing, wherein examples of the invention are shown, and wherein:

FIG. 1 is a perspective view of a rice container constructed in accordance with the invention, FIG. 2 is a transverse, vertical, sectional view of the container, FIG. 3 is a perspective view of a plurality of containers packaged in a carton, FIG. 4 is a perspective view of a modified, open and unfilled rice container, and FIG. 5 is a perspective view of the modified container having rice therein and closed.

In the drawing, the numeral 10 designates a rectangular enclosure formed of one or more sheets 11 of thin, flexible or pliable material folded and/or stitched or otherwise secured at its margins to provide a relatively flat bag or envelope. It is noted that the enclosure may vary in size and shape so long as its contour and dimensions do not interfere with packaging and handling of said enclosure. The sheet 11 may be paper, vegetable parchment, metal foil, plastic, or other thin manually tearable, disposable material which is substantially non-porous and resistant to water and heat. As shown by the numeral 12, one end or margin of the enclosure may be formed by folding the material upon itself and the other enclosure margins, the opposite end, top and bottom, may be suitably secured by stitching or other seam forming means 13, 14 and 15. Manifestly, the margins of the enclosure may be secured together by numerous methods including adhesives, crimping, stapling, heat-sealing, die-cutting and pressing, and said enclosure may be formed of tubular material having only two margins requiring closure, since the exact nature of the connection or seam is not critical.

A predetermined or measured quantity, such as one-half cup, of rice 16 is inserted in the enclosure prior to the application of the top seam or stitching 14 (FIG. 2). In order to permit the escape of water soluble starches evolved from the rice during cooking, a plurality of minute openings or perforations 17 are formed in the sheet material at suitable spaced intervals. Although the minimum size of the openings has not been determined, any diameter large enough to accommodate the passage of water or starch particles and small enough to prevent the entry of foreign matter therethrough is sufficient. Of course, the openings 17 are much smaller than the grains of rice. As shown in FIG. 1, the openings need not cover the entire area of the enclosure and may extend through the fold or unseamed margin 12 of the sheet material. The spacing of the openings may vary with the nature of the sheet material to prevent weakening and accidental tearing thereof. Preferably, the openings are arranged in intersecting rows 18 extending diagonally or in non-parallel relation to the margins of the enclosure to prevent undue weakening thereof. If desired, the threads 19 of the top or last stitching 14 may be elongated and extend beyond the enclosure to facilitate handling thereof. A plurality of the enclosures are adapted to be packaged in a suitable carton 20 (FIG. 3).

A modified form of enclosure 21 is shown in FIGS. 4 and 5 and includes one or more sheets 22 of similar material folded and stitched or otherwise secured together at its end and bottom margins as shown by the numerals 23, 24, and 25 to provide a relatively flat bag or envelope. The enclosure 21 has an open top 26 formed by folding and stitching or securing the upper margin of the sheet 22 upon itself to provide a continuous loop or hem 27. A draw string 28 is threaded through the hem for closing the open top of the enclosure after insertion of rice therein. Openings or perforations 29, identical to the openings 17, are formed in the sheet and are arranged and spaced in substantially the same manner. A predetermined or measured quantity of rice is adapted to be placed within the enclosure prior to cooking and, if desired, measurement marks 30 may be provided on one or both flat surfaces of the enclosure to facilitate use of the latter with different quantities of rice. Of course, the size and dimensions of the enclosure are subject to variation in accordance with the desired quantities of rice. Except for its open top 26, hem 27 and draw string 28, the enclosure 21 is identical to the enclosure 10 and both enclosures provide containers for confining rice during cooking thereof. It is noted that a number of the enclosures 21 may be packaged in a box of loose rice (not shown).

Either of the rice-filled containers is adapted to be placed in a suitable cooking utensil or vessel for boiling or steaming the rice. Since rice is cooked customarily by boiling, the container is immersed in water which is boiled until the rice is done. Of course, the cooking time varies in accordance with the type and variety of rice. The cooking of rice evolves water soluble starches which tend to adhere to the rice grains whereby the latter are gummy and stick together as well as to the cooking vessel. Due to this invariant condition, there is a tendency to manually stir the rice which breaks the grains and permit the release of additional soluble starches so as to increase the gumminess of the rice. As is well-known, such rice is unpalatable and requires washing, draining and reheating before serving and the cleaning of the cooking vessel is laborious due to the stuck rice. By the cooking process of this invention, the cooked rice is fluffy, non-sticky and relatively free of water soluble starches, and manual stirring of the rice during cooking is prevented. Although water enters the enclosure 10 or 21 of the container through the openings 17 or 29 of the sheet material 11 or 22 upon initial immersion of said enclosure, the heat of cooking generates a pressure therein which ejects or forces the evolved starches and water outwardly through said openings so as to separate said starches from the rice. The starches are suspended in the water and when the pressure within the enclosure becomes sufficient, the reentry of the starch suspension is resisted. Excess starches, which remain in the container, adhere to the sheet material rather than to the rice grains.

When the rice is done, the container is removed from the cooking vessel and the rice may be drained due to the openings. If desired, the rice may be steam dried by placing the container in an empty vessel or an oven for heating. After draining or drying, the enclosure is adapted to be torn open for removal and serving of the rice and said enclosure is discarded or thrown away. Since the cooking vessel is readily cleansed by rinsing with hot water, there is no laborious cleaning chore involved in the cooking process. The necessity of a collander for draining and/or washing the rice is obviated and reheating is not required. Manifestly, the cooking process is applicable to the containers irrespective of whether the same are employed for packaging the rice or whether measured quantities of rice are inserted in said containers by the user. Of course, the packaging of measured quantities of rice in the containers facilitates handling thereof and saves time for the user.

The foregoing description of the invention is explanatory thereof and various changes in the size, shape and materials, as well as in the details of the illustrated construction may be made, within the scope of the appended claims without departing from the spirit of the invention.

What I claim and desire to secure by Letters Patent is:

1. In combination, uncooked rice, and a disposable container for cooking the rice, the container including an enclosure holding a predetermined quantity of uncooked rice and formed of flexible and manually tearable and substantially non-porous material resistant to heat and water, the enclosure having a plurality of perforations of a size and quantity large enough to permit the passage of water and water-soluble starch therethrough and small enough to prevent the passage of rice therethrough and restrict the release of the pressure generated by the conversion to steam of water which enters through the perforations upon placing of said enclosure in boiling water when cooking the rice whereby the generated pressure resists the entry of additional water and emits water containing soluble starch through said perforations to separate the starch from the rice, said perforations permitting the draining of water from said enclosure prior to removal of the cooked rice therefrom.

2. The combination as set forth in claim 1 wherein said material is vegetable parchment.

References Cited in the file of this patent

UNITED STATES PATENTS

| | | |
|---|---|---|
| 1,764,039 | Cooper | June 17, 1930 |
| 1,912,963 | Blum | June 6, 1933 |
| 2,042,039 | Cooper | May 29, 1936 |
| 2,460,735 | Carroll | Feb. 1, 1949 |

FOREIGN PATENTS

| | | |
|---|---|---|
| 8,008 | Great Britain | 1887 |
| 661,820 | Great Britain | Nov. 28, 1951 |

OTHER REFERENCES

"Refrigeration Engineering," February 1954, page 46.